Feb. 28, 1950     W. B. McLEAN ET AL     2,498,997
PHOTOELECTRIC INCLINOMETER AND ACCELEROMETER
Filed Oct. 27, 1948
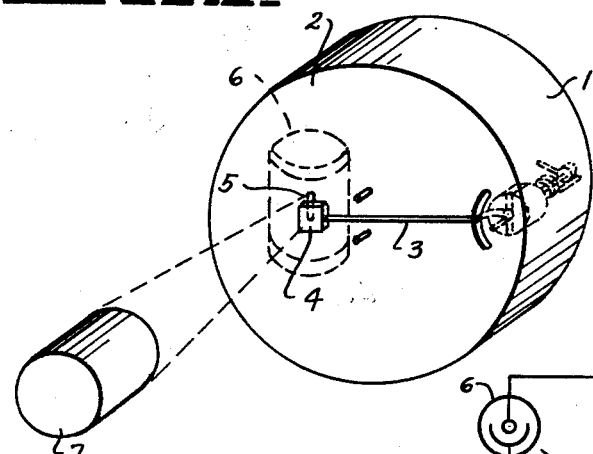
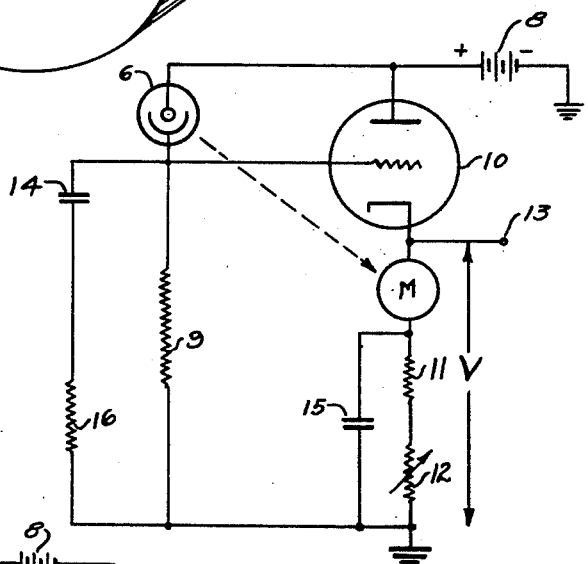
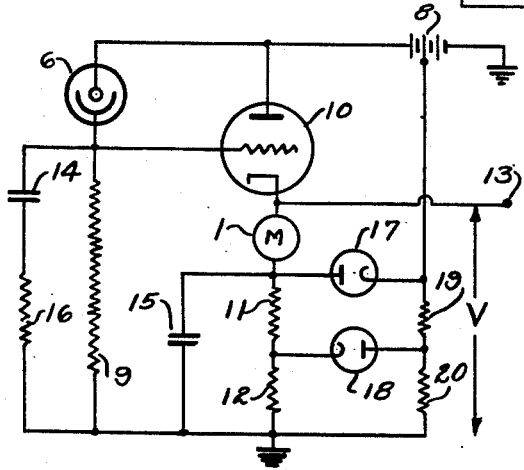
INVENTORS.
IRVIN H. SWIFT
W. B. McLEAN
BY Wade Koontz AND
James S. Shannon
ATTORNEY
AGENT Patented Feb. 28, 1950

2,498,997

UNITED STATES PATENT OFFICE 2,498,997

PHOTOELECTRIC INCLINOMETER AND ACCELEROMETER

William B. McLean and Irvin H. Swift, Inyokern, Calif., assignors to the United States of America as represented by the Secretary of the Air Force Application October 27, 1948, Serial No. 57,544

5 Claims. (Cl. 250—231)

1

The invention described herein may be manufactured and used by or for the Government for governmental purposes without payment to us of any royalty thereon.

This invention relates to a device for giving an electrical indication of the angle between a given line and the horizontal. Also when properly mounted and orientated the device is capable of giving an electrical indication of any acceleration to which the device is subjected in a given direction.

The device employs an ordinary direct current milliammeter movement with the hand of the milliammeter weighted and arranged to intercept a beam of light focused on a photoelectric cell through a slot in the face of the meter. The photoelectric cell operates through a vacuum tube to control the current through the meter so that any tendency for the meter hand to move results in a change in the amount of light falling on the cell which causes the current through the meter to change in such a way as to oppose the tendency of the meter hand to move. The meter hand therefore stays in substantially the same position while the current through the meter varies as a function of the torque applied to the hand.

As an inclinometer the device is useful as a dive angle meter in aircraft. In this application the meter is mounted so that the hand points along the line of flight and is movable in a vertical plane. The current through the meter is adjusted to just balance the pull of gravity on the hand when the plane is in a horizontal position. When the plane is in the diving position the component of gravity perpendicular to the meter hand varies with the angle of dive. This causes the torque on the meter and the current through the meter necessary to balance this torque to vary with the angle of dive.

When used as a dive angle corrector in toss bombing equipment the dive angle meter provides the correct dive angle function plus a correction for one-half the range wind. This is due to the fact that if a range wind is present the plane flies a curved path which is convex upward for a head wind and convex downward for a tail wind. The curvature of the path produces an acceleration normal to the path of plane which makes the dive angle meter read an angle which is too steep if there is a tail wind and too shallow if there is a head wind. The net result is a correction for one-half the error produced by the wind.

As an accelerometer the device is mounted so that the acceleration in question is in a direction perpendicular to the meter hand. In this application any acceleration will produce a change in meter current which may be utilized to maintain the speed of a moving object constant. In a similar manner the angular velocity of a revolving object may also be maintained constant by this device when mounted with the hand perpendicular to a line through the center of rotation.

The device may also be used as an effective voltage regulator in a manner that will be explained later.

The details of a specific embodiment of the invention are shown in the accompanying drawings in which:

Fig. 1 shows the special meter used in the invention,

Fig. 2 is a diagram of the electrical circuit used with the meter,

Fig. 3 is similar to Fig. 2 but shows in addition the use of diodes to alter the characteristic of the system.

Referring to Fig. 1 a direct current meter 1 is shown having a face 2 and a hand 3. A small weight 4 is attached to the end of hand 3 which, in addition to adding weight to the hand, serves also to mask part of slot 5 in face 2. A photoelectric cell 6 is mounted behind slot 5 and face 2 and receives the light from light source 7 that misses weight 4 and passes through slot 5. Slight movements of hand 3 vary the amount of light falling on cell 6 which in turn varies the current through the meter in such a way as to oppose the movement of the hand, as will be explained in connection with Fig. 2.

In Fig. 2 the photocell 6, which is built into meter 1 as indicated by the dotted line, has its anode connected to the positive terminal of a source of a direct current 8 and its cathode connected through a high resistance 9, of the order of 25 megohms, to ground which is also the negative side of source 8. The grid of vacuum tube 10 is connected to the cathode of the photocell 6 so that voltages developed across resistor 9 by the photoelectric current are applied between the grid and ground. The meter 1 is connected in series with resistors 11 and 12 between the cathode of tube 10 and ground. Since the anode of tube 10 is connected directly to the positive terminal of source 8, the meter and resistors 11 and 12 in parallel with whatever impedance may be connected between terminal 13 and ground constitute the entire load impedance of the tube.

The voltage between the grid and cathode of tube 10 is equal to the difference between the voltage developed across resistor 9 and the voltage between terminal 13 and ground. An increase in the amount of light falling on cell 6 causes an increase in voltage drop across resistor 9 and causes the space current of tube 10 and the voltage V to be adjusted to a higher value. Similarly a decrease in the excitation of cell 6 reduces the voltage across resistor 9 and likewise the space current of tube 10 and the voltage V are reduced.

When the device is to be used as a dive angle meter the meter is mounted as shown in Fig. 1 with the hand pointing in the direction of flight and movable in a vertical plane. In this application, with the airplane in level flight, there are two counterclockwise torque producing forces acting on the hand, namely, the force of gravity acting at right angles to the hand and the force exerted by the hairspring of the meter, the latter however is preferably adjusted to zero. By adjustment of resistor 12 the current through the meter may be adjusted to produce a clockwise torque just equal to the above mentioned counterclockwise torque with the hand in its normal position which, in this case, is the horizontal position shown in Fig. 1 with the weight 4 partially masking the slot 5. When the direction of the airplane is tilted downward as in a dive the component of gravitational force perpendicular to the hand becomes less and the counterclockwise torque due to this force is reduced. As a result of this the hand tends to move upward, however in so doing the amount of light falling on the photocell is decreased. This operates to decrease the current through the meter and therefore reduces the clockwise torque resulting from this current. The two effects are opposed so that the hand remains in substantially the same position and the effect of changing the angle of dive is to change the value of current through the meter and the voltage V. There is therefore a known relationship between this voltage and the angle of dive. This relationship is given by the following equation:

$$V = RI_0 \cos A - B$$

where:

R = the total resistance between the cathode of tube 10 and ground.
$I_0$ = value of current needed to balance the hand in a horizontal position if the meter hairspring is adjusted to zero tension.
B = constant determined by the torque of the meter hairspring.
A = dive angle or angle between the axis of the plane and horizontal.

If the airplane while diving is subjected to a tail wind the path flown is convex upward. This curved path produces an acceleration normal to the path of the plane and therefore causes a counterclockwise torque on the meter hand. This causes the meter to indicate a smaller dive angle than in the absence of wind as required to correct for the effect of the wind. Likewise the convex downward path flown in the presence of a head wind produces an acceleration in the opposite direction to the above and causes a clockwise torque to be exerted on the meter hand. This causes the meter to indicate a steeper dive angle as required to correct for the effect of the head wind.

When used as an accelerometer the device is so mounted that the acceleration to be measured is normal to the meter hand. The resistor 12 and the tension of the hairspring if necessary are then adjusted to balance the hand in the position shown in Fig. 1. If the meter is mounted so that the hand moves in a horizontal plane the torque produced by the hairspring will be the only restoring force on the hand, whereas if the plane of movement is not horizontal the effect of gravity on the hand must be taken into account. In the presence of an acceleration the meter hand tends to rotate in one direction or the other depending upon whether the acceleration is positive or negative. This tendency for the hand to rotate results in a change in meter current for reasons already explained and this change in current, or in the voltage V, is a function of the acceleration. The current through the meter under the given acceleration is completely independent of circuit characteristics and may be varied only by changing the magnetic flux or spring forces of the meter. This is the chief advantage of this arrangement.

A use for the above described control circuit apart from the measurement of gravitational or acceleration forces is as a voltage regulator. Referring again to Fig. 2 the circuit may be used to maintain a substantially constant voltage between the terminal 13 and ground in spite of changes in the load connected to this terminal. When used as a voltage regulator the meter is preferably mounted so that the hand moves in a horizontal plane. The tension of the hairspring and the value of resistor 12 are then adjusted to balance the meter as shown in Fig. 1 and to give the desired voltage between terminal 13 and ground. If the load is increased the current through meter 1 tends to drop and this causes the hand to begin rotation in a counterclockwise direction. However, this results in more light on the photocell which acts to increase the space current of tube 10 and to oppose any reduction in the voltage V. The increase in space current also causes an increase in meter current which opposes the tendency of the hand to rotate so that the hand stays in substantially the same position. An increase in load impedance causes the current through the meter to increase and the hand to tend to rotate in a clockwise direction. However, this reduces the light on the photocell which reduces the space current of tube 10 and opposes a rise in output voltage. Therefore the voltage V is substantially unaffected by load impedance variations.

The condensers 14 and 15 and the resistor 16 in Fig. 2 are for the purpose of suppressing parasitic oscillations that might occur in the circuit. The condenser 15 performs the added function of causing a more rapid action of the system in opposing displacements of the meter hand. This is due to the fact that the potential across condenser 15 cannot change instantly and therefore initially the full effect of a voltage change across resistor 9 due to a displacement of the meter hand is applied between the grid and cathode of tube 10 thus causing a rapid initial change in the current through meter 1. The condensers 14 and 15 may have capacities of about 0.0005 microfarad and 0.5 microfarad respectively.

The shape of the curve relating the voltage V to the dive angle or the acceleration may be modified by the use of diodes as shown in Fig. 3. The diodes become operative at various values of meter current to change the load resistance of the tube and therefore the slope of the above mentioned characteristic. The potentials of the cathode and anode of diodes 17 and 18 respectively are determined by the potential divider 19—20. The anode of diode 17 and the cathode of diode 18 are connected to points on the load resistance of tube 10. When the current through resistors 11 and 12 reaches a sufficiently high value that the anode of diode 17 becomes positive with respect to its cathode the diode begins to conduct thus lowering the load resistance of the tube. Similarly the diode 18 becomes conductive when the current through resistors 11 and 12 has fallen to a sufficiently low value for the anode of diode 19 to become positive with respect to its cathode. More diodes may be used to change the slope of the characteristic at other points if desired.

What we claim is:

1. Apparatus of the class described comprising a direct current ammeter movement having a meter hand attached thereto and movable by said movement, said hand having a relatively wide portion, a photoelectric cell and a source of light, means providing an aperture between said source of light and said cell, said aperture being so positioned that it is partially covered by said relatively wide portion, a vacuum tube having an anode, a cathode and a grid, means for applying the output voltage of said photoelectric cell between said grid and a point of reference potential, a load resistance for said tube, means connecting said meter movement and said load resistance in series between the cathode of said tube and said point of reference potential, means for applying operating potentials to said photoelectric cell and to the anode of said tube, and means for taking an output voltage from across said series connected meter movement and load resistance.

2. Apparatus as claimed in claim 1 in which a condenser is connected in shunt to said load resistance to increase the speed of response of said circuit.

3. Apparatus as claimed in claim 2 in which a condenser is connected between said grid and said point of reference potential to by-pass high frequencies.

4. Apparatus as claimed in claim 3 in which a plurality of diodes are provided with each diode having one of its electrodes connected to a point on said load resistance and the other of its electrodes connected to a point of positive potential relative to ground.

5. Apparatus as claimed in claim 1 in which said meter hand is weighted.

WILLIAM B. McLEAN.
IRVIN H. SWIFT.

REFERENCES CITED

The following references are of record in the file of this patent:

UNITED STATES PATENTS

| Number | Name | Date |
|---|---|---|
| 2,141,175 | Dawson | Dec. 27, 1938 |